United States Patent Office 2,801,153
Patented July 30, 1957

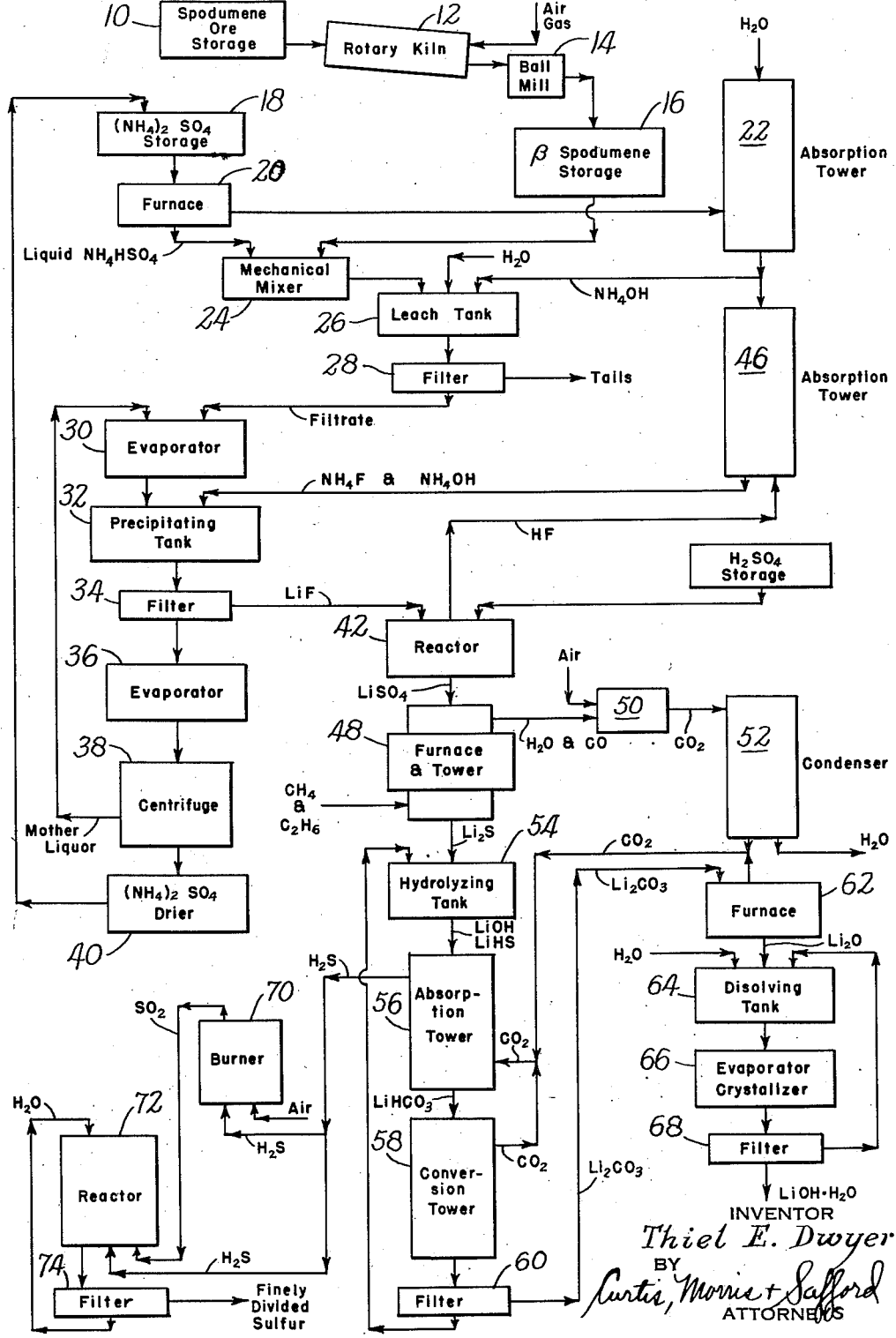

2,801,153

RECOVERY OF LITHIUM FROM SPODUMENE ORES

Thiel E. Dwyer, Passaic, N. J., assignor to Tholand, Inc., New York, N. Y., a corporation of New York Application August 21, 1953, Serial No. 375,590

11 Claims. (Cl. 23—27)

This invention relates to the extraction of lithium from spodumene ores and more particularly to a novel process for producing a good yield of relatively pure lithium in the form of the carbonate or hydroxide.

Although lithium occurs in a wide variety of minerals and ores, there are only a relatively few ores that are sufficiently available and contain a sufficient amount of lithium to make them attractive as a commercial source of lithium. Among these commercially practicable sources of lithium, spodumene is the mineral that has in recent years attracted the most interest and various processes for recovering the lithium values from spodumene ores have been proposed. In a number of these processes, spodumene is treated with concentrated sulfuric acid to convert the lithium content thereof into soluble form so that it can be leached from the ore by an aqueous leaching agent.

One difficulty with such processes is that an appreciable proportion of the aluminum and iron content of the ore is rendered soluble and dissolved in the leach liquor. This aluminum and iron can be readily precipitated from the leach liquor in a variety of ways, but the resulting precipitate is so voluminous that it tends to carry down lithium with it mechanically and thereby decrease the yield of refined lithium compounds. Another problem that has been encountered in prior processes rises out of the fact that the ores contain a certain proportion of alkali metal compounds that are leached out with the lithium and are rather difficult to separate from the lithium.

It is accordingly an object of the present invention to provide a process that overcomes the foregoing and other defects of the prior processes. It is another object of the invention to provide a process wherein a selective leaching agent is used that dissolves the lithium content of the ore without dissolving aluminum and iron therefrom. It is a further object of the invention to provide a process of producing refined lithium compounds having a relatively low alkali metal content. It is a still further object of the invention to provide a process wherein the primary reagent for solubilizing the lithium content of the ore is regenerated in the course of the process and can be recovered and recycled. Other objects of the invention will be in part obvious and in part pointed out hereafter.

In one of its broader aspects the process of the present invention comprises roasting spodumene ore to convert the alpha-spodumene therein to beta-spodumene in accordance with a known procedure, roasting the resulting beta-spodumene in admixture with a dry ammonium sulphate to convert the lithium therein to a sulphate, and leaching the treated ore with an aqueous liquid to dissolve lithium sulphate therefrom. The roasting of the ore to convert the alpha-spodumene to beta-spodumene is a conventional step that serves to render the lithium in the ore more readily recoverable and is normally carried out at a temperature between 1800° F. and the fusion temperature of the spodumene. It is desirable to avoid heating the ore to a temperature approaching the fusion temperature of spodumene because portions of the ore may melt. A satisfactory roasting temperature is about 1900° F.

In accordance with the present process, the beta-spodumene resulting from the roasting process is mixed with either normal ammonium sulphate or ammonium acid sulphate and heated at a temperature of 300° to 700° F. to convert the lithium therein to a sulphate. When the normal sulphate is used ammonia is evolved during this heating step that is absorbed in water to form aqueous ammonia for subsequent use in the leaching step of the process. When, on the other hand, ammonium acid sulphate is used it reacts with the lithium content of the ore without substantial evolution of ammonia to produce lithium sulphate and the normal ammonium sulphate.

It has been found that the acid sulphate presents certain advantages over the normal sulphate as a solubilizing reagent for the lithium because of the fact that within the temperature range used the acid sulphate is a liquid and can be more readily and completely mixed with the spodumene. Hence, according to a preferred embodiment of the present invention, a quantity of normal ammonium sulphate is heated to convert it into the acid sulphate and ammonia, and the acid sulphate in liquid form is then mixed with the crushed beta-spodumene and heated to convert the lithium values of the beta-spodumene into a sulphate. The ammonia evolved during conversion of the normal sulphate into the acid sulphate is absorbed in water to form aqueous ammonia that is subsequently used in the leaching step of the process.

Upon completion of the reaction between the ammonium sulphate or ammonium acid sulphate and the beta-spodumene the lithium sulphate is leached from the ore. While a variety of aqueous liquids can be used for this leaching step, it has been found especially advantageous to use aqueous ammonia. Since the hydroxides of aluminum and iron are insoluble in the ammoniacal leach liquor, the aqueous ammonia operates as a selective solvent to dissolve the lithium sulphate from the ore, and a nice separation between the lithium on the one hand and the iron, aluminum, magnesium and calcium on the other hand is readily achieved.

The ammoniacal leach liquor containing the lithium sulphate as well as ammonium sulphate formed from the acid sulphate in the preceding step of the process can be treated in any of various ways to recover refined lithium salts therefrom. In accordance with a preferred embodiment of the present method, the leach liquor is treated with ammonium fluoride solution to precipitate lithium fluoride which is then separated by filtration. By using ammonium fluoride as a precipitant the lithium is effectively separated from alkali metal salts, which remain in solution, and lithium having an exceptionally low alkali metal content can thus be obtained. The filtrate can be evaporated and crystallized to recover ammonium sulphate therefrom that can be recycled for further reaction with spodumene ore. It may be noted that the recovered ammonium sulphate is equivalent in amount to that used in treating the ore, except for minor losses that occur during processing.

The precipitated lithium fluoride is heated with sulfuric acid to form a sulphate again and during this heating step hydrogen fluoride is evolved that is absorbed in aqueous ammonia to form the ammonium fluoride solution used in the precipitation step. The aqueous ammonia for reaction with the hydrogen fluoride is obtained, as described above, by absorption in water of the ammonia evolved during initial heating of the ammonium sulphate. It should be noted that the process as so far described is cyclic both with respect to the ammonium sulphate used to treat the spodumene ore and with respect to the ammonium fluoride used to precipitate the lithium sulphate from the leach liquor.

The lithium sulphate solution formed by reaction of the lithium fluoride and sulfuric acid can be further refined in any of a variety of ways. One such method that has been found to give satisfactory results is described in detail hereafter.

The relative proportions of ammonium acid sulphate and spodumene used do not appear to be particularly critical. In general, from 0.5 to 2 parts of the acid sulphate by weight per part of spodumene can be used. The preferred proportions are 1 part by weight of the acid sulphate per part by weight of spodumene. Similarly, the quantity and concentration of the leaching agent can be varied considerably. In general it is desirable that the ammonia concentration of the leaching solution be such as to yield a leach liquor having a pH of the order of 7 to 8.

In order to point out more fully the nature of the present invention, there are given below a specific example of the process of the invention and its application in practical use as well as certain modifications thereof. However, it should be understood that these are not intended to be exhaustive or limiting of the invention. On the contrary, these illustrations and explanations herein are given in order to acquaint others skilled in the art with this invention and the principles thereof and a suitable manner of its application in practical use so that others skilled in the art may be enabled to modify the invention and to adapt it and apply it in numerous forms each as may be best suited to the requirements of a particular use. The present specific example can be most conveniently described by reference to the accompanying drawing which comprises a flow sheet illustrating the manner in which the present invention can be embodied in a continuous process for extracting the lithium values from spodumene ores.

Referring to the drawing, spodumene ore from a storage tank 10 is fed to a rotary kiln 12 wherein it is heated at a temperature of about 1900° F. to convert the alpha-spodumene to beta-spodumene in accordance with a known procedure. The roasted spodumene then flows to a ball mill 14 wherein it is ground to a particle size such that it passes an 80-mesh sieve, after which it goes to a storage tank 16.

Normal ammonium sulphate from a storage tank 18 is transferred to a furnace 20 wherein it is heated at a temperature of about 550° F. and thereby converted into liquid ammonium acid sulphate and ammonia. The ammonia evolved in furnace 20 flows to the bottom of a tower 22 which may be, for example, a packed tower. Water is fed to the top of tower 22 and flows downwardly therethrough absorbing the upwardly flowing ammonia to form ammonium hydroxide solution that is used in a manner described below.

Approximately equal quantities by weight of ammonium acid sulphate from furnace 20 and ground spodumene from tank 16 are fed to mechanical mixer 24 wherein they are mixed and maintained at a temperature of about 550° F. to cause the acid sulphate to react with the lithium of the ore and convert it into a sulphate. From the mixer 24 the mixture is transferred to a leach tank 26 to which ammonia from tower 22 and water are added in such quantities as to provide about 3 parts by weight of leaching solution per part of the ore mixture and to maintain the pH of the leached liquor not less than about 7. As indicated above, the ammoniacal liquor dissolves the lithium sulphate without dissolving iron and aluminum compounds present in the ore.

From leach tank 26 the mixture passes to a filter 28 which operates to separate the leach liquor from the insoluble portions of the ore and the filtrate flows to an evaporator 30. In the evaporator 30 the leach liquor is concentrated by evaporation until the concentration of soluble salts therein is approximately double that in the filtrate from filter 28 and the concentrated liquor then flows to precipitating tank 32 to which an ammonium fluoride solution containing excess ammonia is added. The ammonium fluoride reacts with the lithium sulphate in tank 32 to precipitate lithium fluoride which is separated from the mother liquor in a filter 34. Filtrate from the filter 34 passes to an evaporator 36 wherein it is evaporated to a sufficient extent to cause the ammonium sulphate to crystallize out. The ammonium sulphate crystals are separated from the mother liquor by a centrifuge 38 and the mother liquor is recirculated to the evaporator 30. The ammonium sulphate crystals are dried in a dryer 40 and then returned to the storage tank 18. The recovery of ammonium sulphate is quantitative except for certain small losses that occur in the process and hence the process is essentially cyclic with respect to the ammonium sulphate.

Lithium fluoride from the filter 34 is washed with ammonia to provide a product substantially free from sodium and potassium salts and transferred to a reactor 42 and mixed therein with sulfuric acid from a storage tank 44. The resulting mixture is heated to about 550° F. at which temperature the lithium fluoride is converted to the sulphate and hydrogen fluoride is evolved. The hydrogen fluoride evolved flows to the bottom of a tower 46 which is fed at its top with ammonium hydroxide solution from tower 22. The hydrogen fluoride reacts with the downwardly flowing aqueous ammonia to form ammonium fluoride that is used as the precipitating agent in tank 32.

Lithium sulphate formed in the reactor 42 is transferred to the top of a heated tower 48 that is maintained at a temperature of about 2100° F. At this temperature the lithium sulphate is liquid and readily flows down through the tower. A reducing gas such as hydrogen, methane, ethane or natural gas is fed to the bottom of tower 48 and reacts with the lithium sulphate to reduce it to the sulfide which is also liquid at this temperature. The gases leaving the top of tower 48 comprise water and carbon monoxide and are mixed with air and burned in a chamber 50 to convert the carbon monoxide to carbon dioxide. The gases from the chamber 50 flow to a condenser 52 wherein water is condensed therefrom to provide substantially pure carbon dioxide gas that is used in the manner described below.

The lithium sulfide from the bottom of tower 48 is transferred to a tank 54 wherein it is dissolved in a spent lithium carbonate liquor, the origin of which is indicated below. In this aqueous liquor the lithium sulfide is hydrolyzed to lithium acid sulfide and lithium hydroxide and the resulting solution flows to the top of a tower 56. Carbon dioxide gas from several different sources including condenser 52 is supplied to the bottom of tower 56 and reacts with the downwardly flowing solution to convert the lithium hydroxide and acid sulfide to lithium bicarbonate which flows to the top of a tower 58. In the tower 58 the lithium bicarbonate solution is heated to a temperature just below its boiling point and thereby converted to the normal carbonate. Since the normal carbonate is less soluble than the acid carbonate a portion of the normal carbonate precipitates and is removed from the solution by filtration in a filter 60. The filtrate is spent lithium carbonate liquor that is returned to tank 54 to dissolve further quantities of lithium sulfide coming from the bottom of tower 48. The carbon dioxide evolved in tower 58 as an incident of the conversion of the lithium acid carbonate to the normal carbonate is fed to the bottom of tower 56 in admixture with the carbon dioxide coming from condenser 52.

The lithium carbonate from filter 60 is transferred to a furnace 62 wherein it is heated to a temperature of 2100° F. and thereby converted into the lithium oxide and carbon dioxide gas. The evolved gas is mixed with the carbon dioxide from condenser 52 and flows to the bottom of tower 56.

The lithium oxide from furnace 62 is transferred to a tank 64 wherein it is dissolved in a concentrated lithium hydroxide solution from which it crystallizes as lithium hydroxide monohydrate. The solution from tank 64 flows to an evaporator-crystallizer 66 wherein the solution is concentrated to cause crystals of lithium hydroxide monohydrate to be formed. The resulting slurry is then filtered in a filter 68 and the mother liquor is returned to the tank 64 for use in dissolving further quantities of lithium oxide from furnace 62. The product crystals are highly refined lithium hydroxide monohydrate.

As an incident of the conversion of the lithium acid sulfide to the lithium bicarbonate in tower 56 hydrogen sulfide is formed and removed near the top of tower 56. This hydrogen sulfide can be disposed of in any suitable manner but one method of providing for its satisfactory disposition is indicated in the drawing. Thus the hydrogen sulfide flowing from the top of tower 56 is divided and approximately one-third by volume is burned in the air in a chamber 70 to form sulfur dioxide. The remaining hydrogen sulfide and the sulfur dioxide formed in chamber 70 are bubbled through a body of water in a reactor tank 72 and react to precipitate finely divided elemental sulfur which can be removed from the water in a filter 74. The filtrate from filter 74 is returned to tank 72. The elemental sulfur formed in tank 72 is quite finely divided and sometimes difficult to filter. However, it can be rendered readily filterable by addition of calcium hydroxide to the water suspension. The filtered product is either elemental sulfur or a mixture of sulfur and calcium hydroxide. In either case it is a non-corrosive solid that can be readily disposed of.

From the foregoing description it should be apparent that the present invention provides a process capable of achieving the several objectives set forth in the present specification. By using dry ammonium sulfate as the primary reagent for solubilizing the lithium content of the spodumene the process can readily be operated in a cyclic manner with recycling of the ammonium sulphate. Also the ammoniacal leaching solution is highly selective in its action since it dissolves the lithium sulphate while at the same time preventing solution of the aluminum, iron, calcium and magnesium present in the ore. The ammonium fluoride precipitation step provides a nice separation between the lithium and any alkali metal salts that may be associated with it and since ammonia is produced in the initial treatment of the ore the ammonium fluoride can be regenerated and recycled. Thus there is a novel cooperative relation between the ammonium fluoride precipitation step and the initial treatment of the ore with ammonium sulphate or ammonium acid sulphate.

I claim:

1. The method of extracting lithium values from spodumene ores which comprises heating the spodumene ore at a temperature between 1800° F. and the fusion temperature of spodumene to convert the alpha-spodumene in the ore to beta-spodumene, roasting the resulting beta-spodumene in admixture with a dry ammonium sulphate at a temperature of 300°–700° F. to convert the lithium therein to a sulphate, leaching the roasted ore with an aqueous leaching agent to dissolve lithium sulphate and ammonium sulfate therefrom, treating the leach liquor to recover lithium values therefrom, and recovering the ammonium sulfate in the leach liquor and reacting it with further quantities of said beta-spodumene.

2. The method of extracting lithium values from spodumene ores which comprises heating the spodumene ore at a temperature between 1800° F. and the fusion temperature of spodumene to convert the alpha-spodumene in the ore to beta-spodumene, roasting the resulting beta-spodumene in admixture with dry ammonium acid sulphate at a temperature of 300° to 700° F. to convert the lithium therein to a sulphate, leaching the roasted ore with an aqueous leaching agent to dissolve lithium sulphate and ammonium sulfate therefrom, treating the leach liquor to recover lithium values therefrom, and recovering the ammonium sulfate in the leach liquor and reacting it with further quantities of said beta-spodumene.

3. The method of extracting lithium values from spodumene ores which comprises heating the spodumene ore at a temperature between 1800° F. and the fusion temperature of a spodumene to convert the alpha-spodumene in the ore to beta-spodumene, roasting the resulting beta-spodumene in admixture with dry normal ammonium sulphate at a temperature of 300° to 700° F. to convert the lithium therein to a sulphate, leaching the roasted ore with an aqueous leaching agent to dissolve lithium sulphate and ammonium sulfate therefrom, treating the leach liquor to recover lithium values therefrom, and recovering the ammonium sulfate in the leach liquor and reacting it with further quantities of said beta-spodumene.

4. The method of extracting lithium values from spodumene ores which comprises heating the spodumene ore at a temperature between 1800° F. and the fusion temperature of spodumene to convert the alpha-spodumene in the ore to beta-spodumene, mixing the resulting beta-spodumene with molten ammonium acid sulphate, roasting the resulting mixture at a temperature of 300° to 700° F. to convert the lithium therein to a sulphate, leaching the roasted ore with an aqueous leaching agent to dissolve lithium sulphate and ammonium sulfate therefrom, treating the leach liquor to recover lithium values therefrom, and recovering ammonium sulfate in the leach liquor and reacting it with further quantities of said beta-spodumene.

5. The method of extracting lithium values from spodumene ores which comprises heating the spodumene ore at a temperature between 1800° F. and the fusion temperature of spodumene to convert the alpha-spodumene in the ore to beta-spodumene, roasting the resulting beta-spodumene in admixture with a dry ammonium sulphate at a temperature of 300° to 700° F. to convert the lithium therein to a sulphate, leaching the roasted ore with aqueous ammonia to dissolve lithium sulphate therefrom, and treating the leach liquor to recover lithium values.

6. The method of extracting lithium values from spodumene ores which comprises heating the spodumene ore at a temperature between 1800° F. and the fusion temperature of spodumene to convert the alpha-spodumene in the ore to beta-spodumene, mixing the resulting beta-spodumene with dry ammonium acid sulphate, roasting the resulting mixture at a temperature of 300° to 700° F. to convert the lithium therein to a sulphate, leaching the roasted ore with aqueous ammonia to dissolve lithium sulphate therefrom, and treating the leach liquor to recover lithium values.

7. The method of extracting lithium values from spodumene ores which comprises heating the spodumene ore at a temperature between 1800° F. and the fusion temperature of spodumene to convert the alpha-spodumene in the ore to beta-spodumene, heating ammonium sulphate to convert it into ammonium acid sulphate and ammonia, dissolving the evolved ammonium in water to form aqueous ammonia, mixing the beta-spodumene and ammonium acid sulphate and roasting the mixture at a temperature of 300° to 700° F. to convert the lithium in the spodumene to a sulphate, leaching the roasted ore with said aqueous ammonia to dissolve lithium sulphate therefrom, and treating the leach liquor to recover lithium values.

8. The method of extracting lithium values from spodumene ores which comprises heating the spodumene ore at a temperature between 1800° F. and the fusion temperature of spodumene to convert the alpha-spodumene in the ore to beta-spodumene, heating ammonium sulphate to convert it into ammonium acid sulphate and ammonia, dissolving the evolved ammonia in water to form aqueous ammonia, mixing said beta-spodumene and said ammonium acid sulphate and roasting them at a temperature of 300° to 700° F. to convert the lithium in said beta-spodumene to a sulphate, leaching the roasted mixture with said aqueous ammonia to dissolve lithium sulphate therefrom, treating the leach liquor with ammonium fluoride to precipitate lithium fluoride, separating the lithium fluoride by filtration and recovering ammonium sulphate from the filtrate for use in the second step recited above.

9. The method of extracting lithium values from spodumene ores which comprises heating the spodumene ore at a temperature between 1800° F. and the fusion temperature of spodumene to convert the alpha-spodumene in the ore to beta-spodumene, heating ammonium sulphate to convert it into ammonium acid sulphate and ammonia, dissolving the evolved ammonium in water to form aqueous ammonia, mixing said beta-spodumene and said ammonium acid sulphate and roasting the mixture at a temperature of 300° to 700° F. to convert the lithium therein to a sulphate, leaching the roasted mixture with a portion of said aqueous ammonia to dissolve lithium sulphate therefrom, treating the leach liquor with ammonium fluoride to precipitate lithium fluoride, separating lithium fluoride by filtration, recovering ammonium sulphate from the filtrate for use in the second step recited above, treating the precipitated lithium fluoride with sulfuric acid to form lithium sulphate and evolve hydrogen fluoride, and dissolving said hydrogen fluoride in a portion of said aqueous ammonia to form ammonium fluoride for use in treating the leach liquor as recited above.

10. The method of extracting lithium values from spodumene ores which comprises heating the spodumene ore at a temperature between 1800° F. and the fusion temperature of spodumene to convert the alpha-spodumene in the ore to beta-spodumene, roasting the resulting beta-spodumene in admixture with a dry ammonium sulphate at a temperature of 300° to 700° F. to convert the lithium therein to a sulphate, leaching the roasted ore with aqueous ammonia to dissolve lithium sulphate therefrom, treating the leach liquor with ammonium fluoride to precipitate lithium fluoride, separating the precipitated lithium fluoride and treating it with sulfuric acid to form lithium sulphate, heating the lithium sulfate with a reducing gas to form lithium sulfide, treating the resulting lithium sulfide in aqueous solution with carbon dioxide to form lithium acid carbonate, heating the lithium acid carbonate solution to precipitate normal lithium carbonate therefrom, separating and heating the precipitated lithium carbonate to form lithium oxide, dissolving the lithium oxide in an aqueous medium, and crystallizing lithium hydroxide from the resulting solution.

11. The method of extracting lithium values from spodumene ores which comprises, heating the spodumene ore at a temperature between 1800° F. and the fusion temperature of spodumene to convert the alpha-spodumene to beta-spodumene, sulphating the resulting beta-spodumene to convert the lithium therein to a sulphate, leaching the sulphated ore with aqueous ammonia to dissolve lithium sulphate therefrom, and treating the leach liquor to recover lithium values.

References Cited in the file of this patent

UNITED STATES PATENTS

| | | |
|---|---|---|
| 836,781 | Poulenc | Nov. 27, 1906 |
| 876,851 | Wadman | Jan. 14, 1908 |
| 1,430,877 | Bailey et al. | Oct. 3, 1922 |
| 1,515,001 | Girsewald | Nov. 11, 1924 |
| 1,758,448 | Liljenroth | May 13, 1930 |
| 2,230,167 | Sivander et al. | Jan. 28, 1941 |
| 2,516,109 | Ellestad et al. | July 25, 1950 |